United States Patent [19]
Lapaev et al.

[11] 3,984,754
[45] Oct. 5, 1976

[54] DEVICE FOR AUTOMATIC EXCITATION OF BRUSHLESS ELECTRICAL MACHINES

[76] Inventors: Kronid Vasilievich Lapaev, Basseinaya ulitsa, 85, kv. 10; Lev Zalmanovich Madorsky, Bolshoi prospekt, 82, kv. 113; Mikhail Alexandrovich Osinin, Farforovsky post, 70, kv. 16; Viktor Markovich Fux, Varshavskaya ulitsa, 24, kv. 45; Ekaterina Vladimirovna Sanchuk, Lltovskaya ulitsa, 9, kv. 41, all of Leningrad, U.S.S.R.

[22] Filed: Dec. 11, 1974

[21] Appl. No.: 531,816

[52] U.S. Cl. .................................. 322/24; 322/26
[51] Int. Cl.² ....................................... H02P 9/30
[58] Field of Search ............... 321/8 R, 16, 18, 19; 322/24, 26, DIG. 4; 323/20, 21

[56] References Cited
UNITED STATES PATENTS

| | | | |
|---|---|---|---|
| 3,660,752 | 5/1972 | Pfeffer | 322/26 |
| 3,858,107 | 12/1974 | Yarrow et al. | 322/26 |

*Primary Examiner*—A. D. Pellinen
*Attorney, Agent, or Firm*—Haseltine, Lake & Waters

[57] ABSTRACT

A device for automatic excitation of brushless electrical machines, comprising: an A.C. exciter feeding a power converter built around controlled rectifiers disposed on a machine shaft; a converter control circuit employing optoelectronic elements with light-emitting diodes, composed of a booster unit, an inverter unit, and a unit intended for transfer of the converter into a non-controlled rectifier mode; and a photodetector receiving light signals from a stationary light source and located on the machine shaft. The device permits continuous control from boosting modes to inversion.

3 Claims, 5 Drawing Figures

DEVICE FOR AUTOMATIC EXCITATION OF BRUSHLESS ELECTRICAL MACHINES

The present invention relates to control devices of brushless electrical machines, and more particularly, to devices for the automatic excitation of brushes electrical machines and to devices which can be used in high-speed excitation systems of powerful turboalternators and hydrogenerators, as well as of medium- and small-power general- and special-purpose industrial machines.

At present, devices for the automatic control of excitation of brushless electrical machines contain, as a rule, synchronous or asynchronous exciters as feed power sources and have controlled or non-controlled semiconductor rectifiers rotating on a machine shaft as converters to obtain rectified current for exciting the main controlled machine.

Systems employing said exciters and non-controlled rectifiers are less sophisticated in construction and, as a result, possess obvious performance advantages over devices built around controlled rectifiers such as, for example, thyristors.

However, controlled-rectifier systems have a higher control speed, particularly in dynamic modes of operation. They make it possible to quickly suppress the field and thereby stop a failure developing in the machine.

A high boosting capacity of systems using controlled rectifiers allows reduction of start-up period voltage drops and provides a practical solution to the problem of effective use of electrical machines, including synchronous machines, with a high internal reactance. Operation of excitation systems built around rotating controlled rectifiers has proved that these systems can insure a high stability of the output voltage of machines operating into long-distance electric transmission lines or in parallel with other units in a ramified power supply system.

Thus, the ASEA company manufactures ship diesel generating sets with a brushless 30-V 1475 kVA generator whose excitation system uses a rotating converter composed of three diodes and three thyristors connected to form a semi-controlled rectifier. In the ASEA diesel generating sets, signals are transmitted to rotating thyristors with the aid of so-called dynamic transformers or a transmitting electrical machine. Despite certain advantages, the ASEA rectifier possesses limited capabilities in minimizing transient time when the load is cut off or the master generator field is suppressed which makes this rectifier unfit for operation in an inverter mode.

A system of pulse transmission by means of special rotating dynamic transformers becomes much more complicated for devices in which it is required to use a large number of controlled rectifiers (thyristors) or to connect these rectifiers in series or in parallel. The use of multi-channel systems for transmitting signals to the rotating shaft also adds to the complexity of controlled-rectifier systems.

Complex arrangements for electromagnetic transmission of information often increase the length of the plant, reduce the reliability of the equipment and restrict the applicability of devices with rotating controlled converters. One of the ways to solve the above problems is the use of control by light signals.

From the engineering standpoint, the optimum position of a light guide in systems with optical transmission of control signals is between the optical elements of a light source and a photodetector. In this case, the light guide is positioned along the shaft axis and signals are distributed between the rotating thyristors by special light filters mounted at the input and output of the light guide. The number of the light filters must be equal to the number of the rotating thyristors; each light filter is adjusted to a transmission band coincident with the emission band of the stationary light source for a given channel (thyristor). Devices based on this principle are not suitable for machines where the end faces of the shafts are used for measuring the rotation speed in the course of operation, for mounting fixed drives or devices with special bearing boards, and also in dust-laden atmospheres. Besides, the inner shaft spaces of up-to-date turboalternators are filled with water or some other cooling agent and, therefore, mounting of a light guide involves certain engineering difficulties.

The drawbacks of systems with light guides as stated above show that these systems cannot be extensively employed for most brushless electrical machines.

It is an object of the invention to provide an improved automatic control system using a rotating controlled converter which has reliability characteristics not inferior to known non-controlled rectifier devices and at the same time possesses high control parameters specific for controlled-rectifier systems.

It is another object of the invention to raise the reliability and to simplify the design of a device for automatic excitation of brushless electrical machines.

It is still another object of the invention to introduce a simple automatic redundancy system.

It is a further object of the invention to provide a general-purpose device, i.e., a device capable of being used in an automatic control system of a machine of any power output with any number of controlled rectifiers.

With these and other objects in view, the invention resides in a device for automatic excitation of brushless electrical machines, comprising: an A.C. exciter feeding a controlled-rectifier power converter disposed on the shaft of the machine, a control circuit of said converter built around optoelectronic elements with light-emitting diodes and composed of a forcing unit and an inverter unit, and a photodetector mounted on the machine shaft and receiving light signals from a stationary light source, which, according to the invention, is characterized in that the control circuit contains a unit intended for transfer of the power converter into a non-controlled rectifier mode. The light-emitting diodes of said units of the control circuit are connected to the A.C. exciter as rectifiers wherein switching of gates is timed with switching of the rectifiers of said converter, and the light-emitting diodes of said transfer unit are connected to the diodes of the inverter unit through a semiconductor switch with the output thereof connecting the light-emitting diodes of the force unit via a photodetector composed of main and stand-by photoelectric switches built around ganged photo-transistors disposed concentrically with a shift relative to the axes of the directional patterns of light-emitting elements in the light source.

Thus optoelectronic devices (optrons of a type such as includes a light-emitting diode — two-base diode, or a light-emitting diode — four-layer switch, or any other pairs providing proper functioning of the control circuit) with a rotating converter in the control circuit permit construction of a model of said converter on the principle of timing of the switching of the power converter rectifiers with the gates of the light-emitting diodes of appropriate optrons of the power converter, the model being turned on or off by one switch at the side of voltage rectified by the light-emitting diodes of the optrons.

The operation mode of any number of controlled rectifiers connected in any voltage converter circuit is selected by one control channel which switches on or off a rectifier built around light-emitting diodes of a group of optrons generating, for example, boosting control pulses.

The converter control device enables continuous control from boosting modes to inversion by using a known integral control law.

By this technique, control pulses applied to appropriate electrodes of the controlled rectifiers are synchronized in phase with their anode voltage so that boosting pulses are established at points close to the moments of natural rectifier switching for a selected converter circuit, and inverter pulses are established at points corresponding to reliable operation of the converter in the inversion mode, with due allowance for the reactances of the feeding circuits and the parameters of the field winding of the electrical machines which serves as a load.

If both boosting and inverter pulses are applied to the thyristors (or to symistors or any other types of controlled rectifiers), the rectified voltage is increased up to a boosting value.

When boosting pulses are removed, the circuit starts operating in the inversion mode due to which current in the load abruptly goes down. Any intermediate magnitude of the currents is determined by the number of positive- and negative-going sections of the voltage half-waves passed by the converter into the load.

It is preferable that the photoelectric switches of said photodetector are disposed on a ring mounted on the machine shaft, the phototransistors of the main and redundancy photoelectric switches being connected in parallel, and that the light-emitting elements of said light source are arranged on a ring mounted on the stator, the number of the light-emitting elements within any ring sector angle differing by 1 from the number of phototransistors in an appropriate sector of its ring.

This provides high reliability of signal transmission and precise matching of the spatial-time position of the rotating photodetector and the stationary light source.

It is also preferable that the semiconductor switch is made in the form of a transistor base-emitter junction connected in series with a differentiating capacitor, and that an integrating capacitor is connected between the emitter and the collector of the transistor, which the integrating capacitor is connected through a thyristor switch to the light-emitting diodes of the optoelectronic elements in the unit intended for transfer of the converter into a non-controlled rectifier mode.

The above arrangement makes it possible to transfer the controlled converter into operation as a non-controlled rectifier, i.e., to provide automatic redundancy in the cases of occasional failures of individual elements which guarantees a high serviceability of the entire set.

Other objects and advantages of the present invention will become obvious from the following description with the accompanying drawings, in which.

Figure 1:
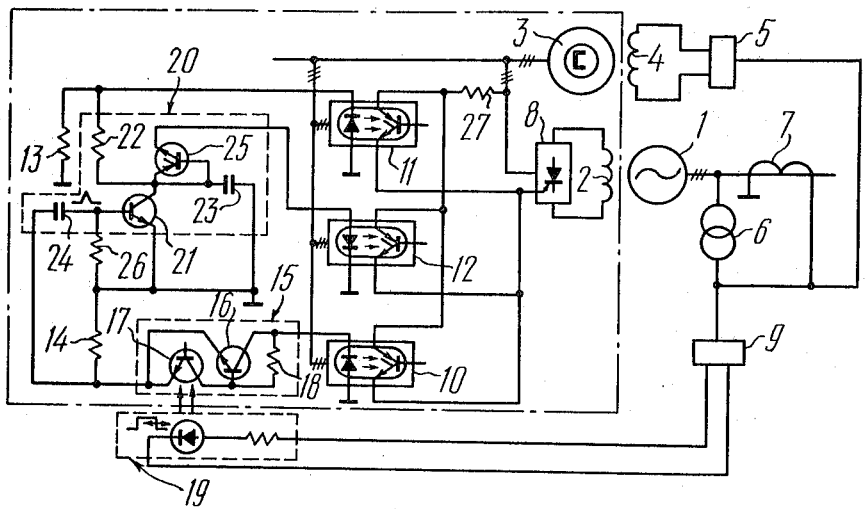
FIG. 1 is a circuit diagram of a device for automatic excitation of brushless electrical machines, in accordance with the invention.

A device for automatic excitation of brushless electrical machines such as, for instance, an alternator 1 (FIG. 1) with a field winding 2 comprises an A.C. exciter 3 with a field winding 4. The exciter 3 is a high-frequency inverted synchronous machine with A.C. windings around the rotor, a field winding on the stator and coercive washers in the magnetic system which promote an easier self-excitation of the alternator in the start-up periods of the generating set.

The field winding 4 is connected to a regulator 5 with its input circuits fed from a voltage sensor 6 and a current sensor 7.

A power converter 8 built around controlled rectifiers is mounted on the shaft of the machine, connected to the field winding 2 of the alternator 1 and supplied from the exciter 3.

The power converter 8 is controlled by a circuit using optoelectronic elements (optrons) with light-emitting diodes mounted on the rotating portion of the machine and controlled through a "light ring" by a regulator 9 connected to the voltage generator 6 and the current sensor 7.

The control circuit of the converter 8 comprises a booster unit 10, an inverter unit 11, and a unit 12 intended for transfer of the converter 8 into a non-controlled rectifier mode.

The booster unit 10 produces pulses actuating A.C. rectification in the converter 8, while the inverter unit 11 generates a signal which reverses the polarity of the rectified voltage across the field winding 2 of the alternator 1.

The light-emitting diodes of the optoelectronic elements of the unit 11 are connected into a circuit similar to that of the power converter 8 and operate as rectifiers into a resistor 13.

The rectified voltage at the resistor 13 is used to feed the unit 12 and other auxiliary circuits.

The connection phase of the switches of the optoelectronic elements in the unit 11 is selected so as to obtain control pulses that insure reliable operation of the converter 8 as an inverter. The light-emitting diodes of the optoelectronic elements of the unit 10 are connected to form a circuit identical to the circuit of the power converter 8 and operate as rectifiers into a resistor 14 when a photoelectronic switch 15 is open. The photoelectric switch 15 is built around a transistor 16, a phototransistor 17 and a resistor 18; it inverts the output of a light source 19 disposed on the stator of the alternator.

The switches of the optoelectronic elements of the unit 10 are connected so as to produce boosting (rectification) pulses at the points of natural switching of the rectifiers of the converter 8. A semiconductor switch 20 consists of a transistor 21, a resistor 22, a storage capacitor 23, a differentiating capacitor 24, and a thyristor switch 25, and is intended for actuating the optrons of the unit 12.

When the machine is initially started in self-excitation modes and also if failures occurs in the main control channel (faulty photodetector and light sources on the stator, optoelectronic elements of the unit 10, automatic regulator 9), the optoelectronic elements of the unit 12 are actuated. The switches of the optoelectronic elements in the unit 12 are connected so as to generate rectification pulses regardless of the operation mode of the alternator 1. In normal operation modes when the main control channel is in operation, the resistor 14 is continuously accepting a width-modulated signal from the photoelectric switch 15. This signal charges a capacitor 24, drives the transistor 21 into conduction and discharges the capacitor 23. This process repeats at each period of the voltage being measured. The switch 25 is open and no power supply comes to the light-emitting diodes of the optrons in the unit 12.

The width-modulated signals at the resistor 14 are absent in the initial excitation period of the alternator 1 and disappear if a fault occurs in the main control channel. The pulses saturating the transistor 21 also disappear and the transistor is cut off by a resistor 26, while the capacitor 23 is charged through the resistor 22 up to the operation level of the switch 25. After operation of the switch 25, the light-emitting diodes of the optron elements of the unit 12 are connected through the same resistor 22 to the power supply voltage set up across the resistor 13 of the light-emitting diodes of the optrons in the unit 11. This causes operation of the switches in the optrons of the unit 12, the converter 8 starts to act as a rectifier and since then excitation of the alternator 1 depends on the magnitude of voltage across the A.C. windings of the exciter 3.

Thus the controlled converter 8 is automatically changed into a rectifier and excitation is controlled by the automatic regulator 5 which performs the additional functions of the main regulator 9 in this mode of operation.

When control pulses appear at the input of the transistor 21, voltage at the capacitor 23 goes down, the switch 25 cuts the light-emitting diodes of the optoelectronic elements in the unit 12 off the power supply voltage and in this way the system of controlling the converter 8 along the main control channel is finally restored.

To avoid false transfer from the main to the redundancy control channel during transient processes, the time constant of the R-C circuit 22-23 is selected so as to ensure a required selective delay in switching the converter 8 into a non-controlled rectifier mode.

Figure 2:
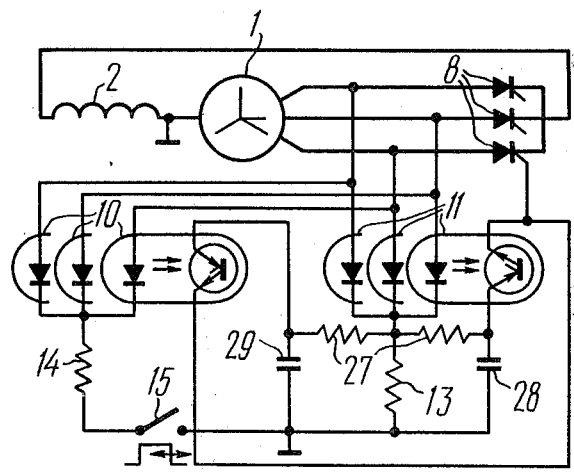
FIG. 2 is a circuit diagram of a controlled converter exemplified by a three-phase rectifier with a null, showing in detail the connection of groups of optrons which generate boosting and inverting pulses.

In the diagram of FIG. 1, the photoelectric switches of the units 10, 11 and 12 are connected directly to the anode circuits of the converter 8 via a resistor 27. However, depending on the type of a circuit producing control pluses to be applied to the converter 8, the switches may be connected to the power supply from the side of their light-emitting diodes as shown in FIG. 2. This connection simplifies the design of the device in systems with resistance decoupling of the circuits (for example, where pulse transformers are employed) and also makes it applicable for controlling converters using light-activated gates (for instance, light-activated thyristors).

FIG. 2 illustrates a detailed diagram of control of the converter 8 connected as a three-phase circuit with a null, from the forcing unit 10 and the inverter unit 11 of the groups of optrons.

With a view to explaining the control principles, FIG. 2 shows one of possible ways of self-excitation of the alternator 1 through the converter 8 connected to the field winding 2 and fed directly from the alternator buses. FIG. 2 illustrates also a detailed diagram of the connection of the light-emitting diodes of the optoelectronic elements in the booster and inverter units which is the same as the diagram of connection of rectifiers in the power converter 8.

The light-emitting diodes of the optrons of the inverter unit 11 are connected to such phases of the supply voltage as to ensure a 120° shift of the control pulses relative to the points of natural switching of the power converter rectifiers. The light-emitting diodes of the optrons in the rectifier unit 10 are connected on one side to the power supply source and on the other side to the loading resistor 13 through the control switch 15.

The light-emitting diodes of the optrons in the inverter unit 11 are permanently connected to the power supply source and to the loading resistor 13 the voltage of which is used to charge capacitors 28 and 29 through resistors 27. After the capacitors are charged up to the operation voltage of the optron switches in the unit 11, control pulses are generated.

As can be seen from FIG. 2, the control switch 15 actuates the system producing pulses which rectify voltage following the pulse-width modulation law. The switch 15 is actuated by a signal proportional to the deviation of the alternator voltage from its rated value.

Figure 3:
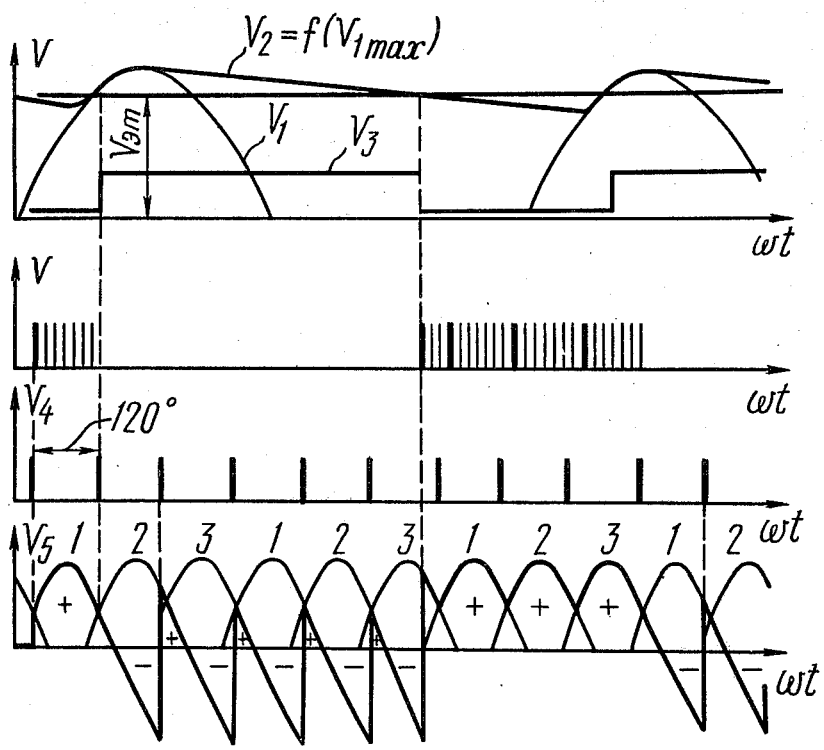
FIG. 3 is a timing chart of operation of the controlled converter of FIG. 2.

The timing chart of the operation of elements in the diagram of FIG. 2 is given in FIG. 3.

The voltage $V_1$ to be measured is converted into a sawtooth voltage $V_2$ whose amplitude is functionally related to the peak value $V_1$ max.

The output regulator voltage $V_3$ is generated within a time interval during which $V_2 \geq VRS$, where VRS is a reference source voltage. The length of the pulse $V_3$ is proportional to the peak value $V_{1\ max}$ of the voltage $V_1$ being measured and corresponds to the interval of the conducting state of the switch 15 (FIG. 2). Inversion mode pulses $V_4$ only are produced during the above interval (FIG. 3). A negative voltage $V_5$ is applied to the field winding 2, the excitation current is decreased, thereby causing a drop in the voltage $V_1$. In the interval $V_3 = 0$ (the switch 15 is open), rectification pulses are generated. Boosting voltage is applied to the winding 2, and the excitation current and the voltage $V_1$ rise.

Thus operation of the switch 15 within any period of the voltage being measured sets any ratio of the intervals of converter operation in the inversion and rectification modes which ensures an excitation current of a magnitude required for a particular mode.

The timing chart shows that the regulator output voltage is a square pulse. If slight changes occur in $V_1$, the leading edge of the pulses $V_3$ is synchronized in phase with the instantaneous value of the measured voltage close to $V_{1\ max}$. At this moment the circuit is changed for operation in the inversion mode, with a maximum delay of not above 360/m electrical degrees where m is the number of phases. The phase of the trailing edge of the pulses $U_3$ coincides with the moment when the circiut is being changed from the inversion into rectification mode, this process having no delay. Since in the course of control, the trailing edge of the pulse $V_3$ may coincide with any value of the power supply voltage, the device effects phase control, i.e., generates a continuous control characteristic.

In this way, the described method of device operation possesses the advantages of integral cycle control (reduction of the high-frequency components, a higher efficiency and cos $\phi$ of the system) combined with the phase control advantages (reduced low-frequency components, continuous control). In the proposed circuit, the construction of rectifier control devices is appreciably simplified as the latter contain no phase-regulating units. The design of an automatic regulator is also mush less complicated. The detecting element may be a simple device using pulse-width modulation of deviation signals which does not need additional amplification and filters to smooth voltages applied to the rectifier control device.

The control switch 15 serving as a photodetector on the photoelectric switch (see FIGS. 1 and 2) is the basic control element of the circuit.

Consequently, a device for transmitting information may comprise a single light-emitting element and an associated photodetector disposed on the end face of the rotating shaft. No additional elements such as special light guides or focusing devices need be mounted, as a light-emitting element and a photocell can be located beside each other. However, for a number of machines this design arrangement is not feasible for the reasons stated at the beginning of the description.

Figure 5:
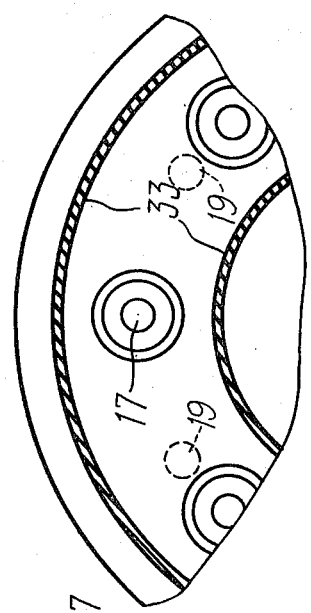
FIG. 5 is a section of the arrangement in FIG. 4 as taken along the line V—V.
Figure 4:
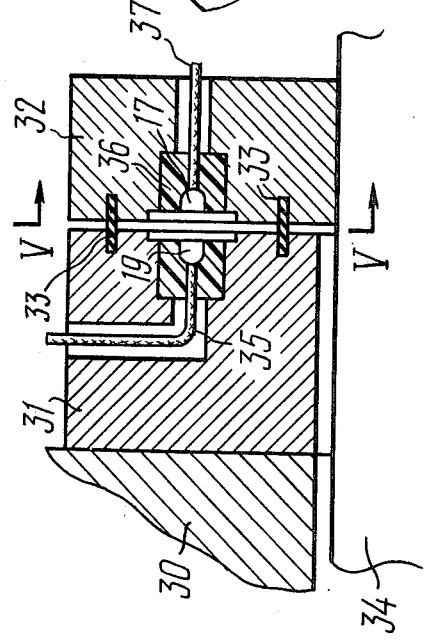
FIG. 4 is a diagrammatic illustration of the arrangement of a photodetector and elements of a stationary light source.

In order to provide a reliable and universal construction which would ensure trouble-free and continuous transmission of signals from any place of the rotating shaft where this device is located, it is recommended that the light-emitting elements and photocells be arranged so as to form a so-called "light ring" (FIGS. 4, 5). The "light ring" consists of a ring 31 fixed on a stator 30, with the light-emitting elements 19 disposed along the periphery of the ring 31. The photocells 17 are mounted on a ring 32 fixed on the rotor shaft. Part of the space between the light-emitting elements and photocells is protected from contamination by packing glands 33. Other glands — ring-type, radial, etc. may also be employed.

FIG. 4 illustrates a shaft 34, leads 35 of a light-emitting element; insulating bushes 36, and photocell leads 37.

Since the light-emitting elements operate in the "light ring" in-phase from the same signal, the light flux in the space between the glands reaches a level several times higher than that required for reliable operation of the photodetectors.

Provisions are made for additional redundancy in the connection of devices to form a "light ring" in case some elements are shorted or a break occurs in the "light ring" or in the circuit of individual elements. To this end, a resistor is connected in series with each light-emitting elements (see FIG. 1). The light-emitting elements 19 with resistors are placed in parallel and connected to the regulator 9.

The rotor ring 32 is divided into sectors, each of which accommodates an assembly of the parallel-connected photocells 17 shunting the base-emitter junction of the same transistor 16. The number of sectors is equal to the number of the parallel-connected transistors 16, while the total number of the photocells 17 in the sector of the rotor ring 32 must differ by 1 from the number of the light-emitting elements 19 mounted within the same angle on the stationary ring 31 of the "light ring."

The proposed arrangement of the elements guarantees optimum reliability and intensity of signal transmission to the rotating shaft with a minimum number of the elements, even without taking into account the directional patterns of individual elements.

What is claimed is:

1. A device for automatic excitation of brushless electrical machines having a shaft, said device comprising:

an A.C. exciter;

a power converter including controlled rectifiers and mounted on the machine shaft;

a control circuit for said converter also mounted on the machine shaft and including a forcing unit, an inverter unit, and a unit for transfer of said converter into a non-controlled rectifier mode;

a stationary light source composed of light-emitting elements;

a photodetector including main and redundancy photo-electric switches and ganged phototransistors which are disposed concentrically with a shift relative to the axes of the directional patterns of said light-emitting elements;

said units of said control circuit including optoelectronic elements with the light-emitting diodes thereof connected to said A.C. exciter and constituting rectifiers, such that gate operation is timed with the operation of the rectifiers in said converter, the light-emitting diodes of the optoelectronic elements of said unit for transfer of the converter into a non-controlled rectifier mode being connected to the diodes of the inverter unit through a semiconductor switch, and the light-emitting diodes of the optoelectronic elements of said forcing unit being connected to the output of said semi-conductor switch through said photodetector. said forcing unit are connected to the output of said semi-conductor switch through said photodetector.

2. A device as defined in claim 1, in which a semiconductor switch comprises a base-emitter junction of a transistor connected in series with a differentiating capacitor, and an integrating capacitor connected between the emitter and collector of said transistor, the integrating capacitor being connected through a thyristor switch to the light-emitting diodes of optoelectronic elements of the unit for transfer of the converter into a non-controlled rectifier mode.

3. A device as defined in claim 1, in which the photoelectric switches of said photodetector and the light-emitting elements of said light source are mounted on rings disposed, respectively, on the shaft and the stator of the machine, each sector of the ring on the shaft containing parallel-connected phototransistor of said main and redundancy photoelectric switches, while the stator ring accommodates light-emitting elements the number of which within any angle of the sector ring differs by 1 from the number of phototransistors mounted in the same sector.

* * * * *